(12) United States Patent
Rule

(10) Patent No.: US 12,045,832 B2
(45) Date of Patent: *Jul. 23, 2024

(54) SYSTEM AND METHOD FOR AUGMENTED REALITY DISPLAY OF ACCOUNT INFORMATION

(71) Applicant: Capital One Services, LLC, McLean, VA (US)

(72) Inventor: Jeffrey Rule, Chevy Chase, MD (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/222,342

(22) Filed: Jul. 14, 2023

(65) Prior Publication Data

US 2023/0360055 A1 Nov. 9, 2023

Related U.S. Application Data

(60) Continuation of application No. 17/533,801, filed on Nov. 23, 2021, now Pat. No. 11,720,901, which is a
(Continued)

(51) Int. Cl.
*G06K 19/07* (2006.01)
*G06F 18/22* (2023.01)
(Continued)

(52) U.S. Cl.
CPC .......... *G06Q 20/409* (2013.01); *G06F 18/22* (2023.01); *G06K 19/07* (2013.01); *G06Q 20/389* (2013.01);
(Continued)

(58) Field of Classification Search
CPC .............. G06Q 20/409; G06Q 20/389; G06Q 2220/00; G06T 7/70; G06V 20/20; G06F 18/22; G06K 19/07
(Continued)

(56) References Cited

U.S. PATENT DOCUMENTS 4,931,629 A * 6/1990 Frankfurt ............ B42D 25/373
235/382
5,727,089 A * 3/1998 Ray ......................... G07C 9/25
382/233
(Continued)

*Primary Examiner* — Bennett M Sigmond
*Assistant Examiner* — Michael J Warden
(74) *Attorney, Agent, or Firm* — HUNTON ANDREWS KURTH LLP

(57) ABSTRACT

A method is provided for displaying an augmented reality image of account information associated with an indicialess transaction card having a card surface with a background pattern applied thereto. A real-time image of the card surface is captured and processed to determine if the background pattern matches a card background pattern associated with a cardholder account. Responsive to a positive determination, communication is established between the user device processor and a card processor carried by the indicialess transaction card. The user device processor receives from the card processor an encrypted verification block and transmits, to an authentication server, an authentication request including the verification block. Responsive to receiving a positive authentication response, the user device constructs an augmented reality image comprising account indicia and displays the augmented reality image superimposed over the real-time image of the background pattern on the card surface of the indicialess transaction card.

11 Claims, 8 Drawing Sheets

Related U.S. Application Data division of application No. 16/458,969, filed on Jul. 1, 2019, now Pat. No. 11,210,676.

(51) Int. Cl.
*G06Q 20/38* (2012.01)
*G06Q 20/40* (2012.01)
*G06T 7/70* (2017.01)
*G06V 20/20* (2022.01)

(52) U.S. Cl.
CPC ............... *G06T 7/70* (2017.01); *G06V 20/20* (2022.01); *G06Q 2220/00* (2013.01)

(58) Field of Classification Search
USPC .......................................................... 705/44
See application file for complete search history.

(56) References Cited

U.S. PATENT DOCUMENTS

| | | | |
|---|---|---|---|
| 6,257,486 B1 | 7/2001 | Teicher et al. | |
| 6,628,808 B1* | 9/2003 | Bach | G06V 30/133 |
| | | | 382/137 |
| 7,360,692 B2* | 4/2008 | Zellner | G06K 7/00 |
| | | | 705/41 |
| 7,949,373 B2 | 5/2011 | Whiting | |
| 7,987,498 B2 | 7/2011 | Tanada et al. | |
| 8,083,130 B1 | 12/2011 | Cipriano | |
| 8,511,548 B1 | 8/2013 | Mori et al. | |
| 8,643,890 B1* | 2/2014 | Peterson | G06F 3/1242 |
| | | | 358/1.18 |
| 9,607,418 B1 | 3/2017 | Hemminger | |
| 9,836,736 B1* | 12/2017 | Neale | G06T 11/00 |
| 10,109,095 B2* | 10/2018 | Johansen | G06F 3/017 |
| 10,943,229 B2* | 3/2021 | Dolan | G06F 3/011 |
| 11,055,691 B2* | 7/2021 | Deprun | H04B 5/72 |
| 11,062,098 B1* | 7/2021 | Bergeron | H04L 9/3242 |
| 11,210,676 B2* | 12/2021 | Rule | G06T 7/70 |
| 11,501,312 B2* | 11/2022 | Rule | G06Q 20/40975 |
| 2002/0174336 A1 | 11/2002 | Sakakibara et al. | |
| 2003/0120612 A1 | 6/2003 | Fujisawa et al. | |
| 2005/0140497 A1* | 6/2005 | Chiviendacz | B42D 25/00 |
| | | | 340/5.67 |
| 2005/0240528 A1* | 10/2005 | Hendrick | G06Q 20/40145 |
| | | | 705/44 |
| 2006/0229988 A1 | 10/2006 | Oshima et al. | |
| 2009/0278660 A1* | 11/2009 | Beisang | H04L 9/3231 |
| | | | 340/5.82 |
| 2011/0155802 A1 | 6/2011 | Shah et al. | |
| 2011/0195748 A1 | 8/2011 | Main et al. | |
| 2013/0173405 A1 | 7/2013 | Gouessant | |
| 2013/0297507 A1 | 11/2013 | Mechaley, Jr. | |
| 2013/0334323 A1* | 12/2013 | Chiviendacz | G07F 7/1091 |
| | | | 235/494 |
| 2014/0084059 A1 | 3/2014 | Sierchio et al. | |
| 2014/0188640 A1 | 7/2014 | Phillips et al. | |
| 2014/0358790 A1* | 12/2014 | Koichi | G06K 7/1417 |
| | | | 705/44 |
| 2015/0069126 A1 | 3/2015 | Leon | |
| 2015/0106283 A1 | 4/2015 | Lee et al. | |
| 2015/0371219 A1* | 12/2015 | Ljujic | G06Q 40/02 |
| | | | 358/1.18 |
| 2016/0005031 A1* | 1/2016 | O'Regan | G09C 1/00 |
| | | | 705/65 |
| 2016/0019449 A1* | 1/2016 | Auten | G06K 19/06206 |
| | | | 235/492 |
| 2016/0063484 A1* | 3/2016 | Carpenter | G06Q 20/3263 |
| | | | 705/41 |
| 2016/0189127 A1 | 6/2016 | Amarnath et al. | |
| 2016/0300219 A1 | 10/2016 | Foran-Owens et al. | |
| 2016/0379101 A1 | 12/2016 | Hammad et al. | |
| 2017/0004484 A1* | 1/2017 | Seol | G06F 3/04883 |
| 2019/0354959 A1* | 11/2019 | Phillips | G06Q 20/341 |
| 2020/0242688 A1* | 7/2020 | Navarro | G06Q 30/0214 |

\* cited by examiner

SYSTEM AND METHOD FOR AUGMENTED REALITY DISPLAY OF ACCOUNT INFORMATION

CROSS-REFERENCE TO RELATED APPLICATIONS

This application is a continuation of U.S. application Ser. No. 17/533,801, filed Nov. 23, 2021, which is a divisional of U.S. application Ser. No. 16/458,969, filed Jul. 1, 2019, now U.S. Pat. No. 11,210,676, the contents of which are hereby incorporated by reference in their entireties.

FIELD OF THE INVENTION

This disclosure relates generally to systems for processing credit and other transaction cards, and more specifically, to a system for processing a transaction card having no text or other readable indicia printed thereon and displaying account information in an augmented reality image superimposed over an image of the transaction card.

BACKGROUND OF THE INVENTION

Financial transaction cards have become the primary means of carrying out in-person transactions in today's society. Whether they are "passive" cards with a magnetic stripe or "smart" cards with an on-board processor, all such cards carry standard printed and/or embossed indicia on one or both sides, typically including the account number associated with the card, the account holder's name, the name of the card issuer, an expiration date, and a CCV code. Unfortunately, in today's world, such information can provide a gateway to fraud and identity theft. As a result, every time a user presents a standard transaction card to make a payment in a public place, they are potentially jeopardizing their financial security.

SUMMARY OF THE INVENTION

An illustrative aspect of the invention provides an augmented-reality transaction card information display method for use with an indicialess transaction card having a card surface with a background pattern applied thereto. The method comprises capturing, by a digital camera of a user device, a real-time image of the card surface of the indicialess transaction card. The method further comprises processing, by a processor of the user device, the captured real-time image to determine if the background pattern matches a card background pattern associated with a cardholder account associated with the user device. Responsive to a determination that the background pattern matches a card background pattern associated with a cardholder account, communication is established between the user device processor and a card processor carried by the indicialess transaction card. The user device processor receives from the card processor an encrypted verification block and transmits, to an authentication server, an authentication request including the verification block. The user device receives from the authentication server an authentication response. The method further comprises, responsive to the authentication response including an indication that the transaction card is associated with the cardholder account, constructing an augmented reality image comprising account indicia specific to at least one of the set consisting of the cardholder account and the indicialess transaction card. The method also comprises displaying, on a display of the user device, the augmented reality image superimposed over the real-time image of the background pattern on the card surface of the indicialess transaction card.

Another aspect of the invention provides a mobile interface device comprising a data processor and a communication interface in communication with the data processor. The communication interface is configured for selective communication with an authentication server via a network. The mobile interface device further comprises a near field communication interface in communication with the data processor and configured for communication with one or more contactless transaction cards. The mobile interface device still further comprises a user interface comprising at least a user input device and a display device and a digital camera configured to capture a digital image for real-time display on the display device. The mobile interface device also comprises a first memory block accessible by the data processor and containing a transaction card application with instructions to be carried out by the data processor. The transaction card application is configured to recognize an appearance of an indicialess transaction card within the digital images captured by the digital camera, conduct a first authentication of the indicialess transaction card based on an appearance of a background pattern on a surface thereof, establish communication, via the near field communication interface, between the user device processor and a card processor carried by the indicialess transaction card, and receive an encrypted verification block from the card processor. The transaction card application is further configured to verify, using the encrypted verification block, that the indicialess transaction card is associated with a user account associated with the mobile interface device. The transaction card application is still further configured to, responsive to a positive verification that the indicialess transaction card is associated with a user account associated with the mobile interface device, construct an augmented reality image comprising account indicia specific to indicialess transaction card, and display, on the display device, the augmented reality image superimposed over the background pattern of the indicialess transaction card in the captured digital image.

Another aspect of the invention provides a transaction card information processing system comprising a plurality of contactless account holder cards each having a unique identifier associated with an account and comprising a card body having at least one indicialess card surface having a background pattern applied thereto. The card body includes a near field communication card interface, a card data processor in communication with the near field communication card communication interface, and a card memory having the unique identifier stored therein. The system further comprises a card database having stored therein for each of the contactless account holder cards, card data including the unique identifier and associated account information and an authentication server in communication with the card database. The authentication server is configured to receive, from a requesting device over a network, a request to authenticate a challenged one of the contactless account holder cards, to compare information in the request to information from the card database, and to transmit, to the requesting device over the network, an authentication response. The system still further comprises a plurality of mobile interface devices each associated with an account holder account. Each mobile interface device is configured to communicate with the authentication server to confirm that a challenged card is one of the plurality of contactless transaction cards and is associated with the account holder account and, in response to such confirmation, construct an augmented reality image containing indicia related to the account holder account and display the augmented reality image superimposed over a real-time image of the challenged card.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE INVENTION

While the invention will be described in connection with particular embodiments and manufacturing environments, it will be understood that the invention is not limited to these embodiments and environments. On the contrary, it is contemplated that various alternatives, modifications and equivalents are included within the spirit and scope of the invention as described.

Figure 1:
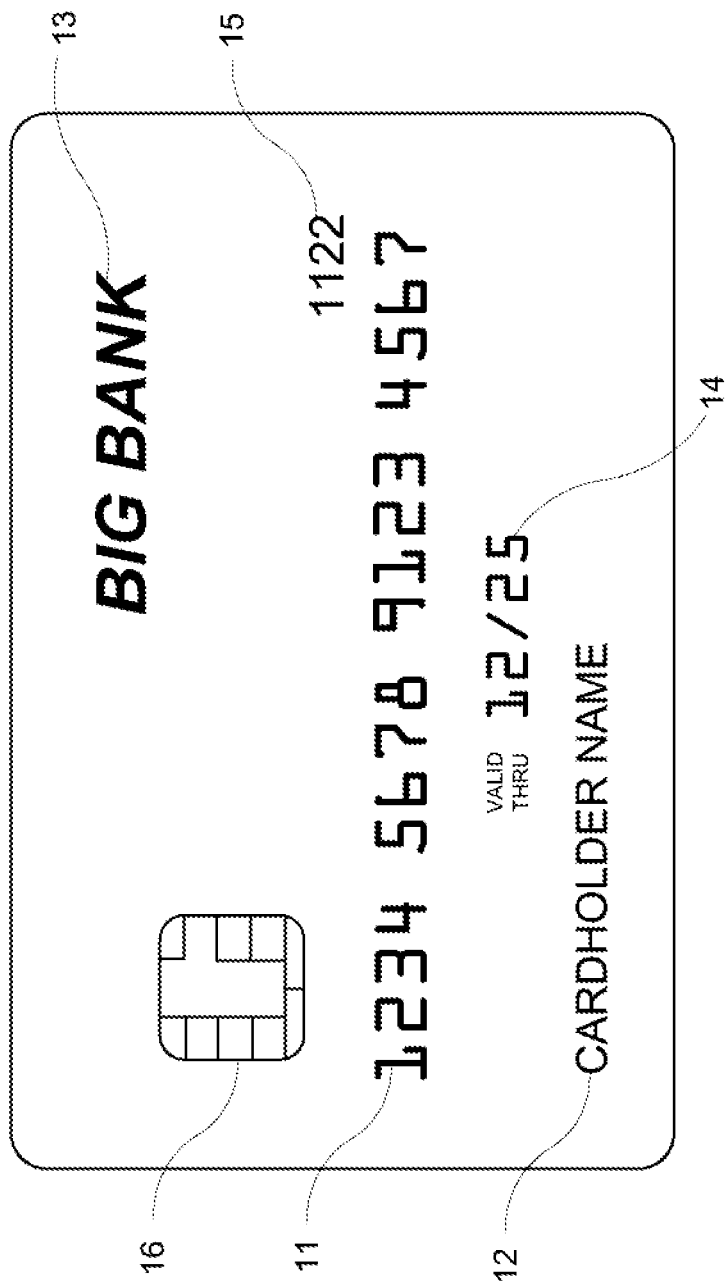
FIG. 1 is an illustration of a prior art transaction card.

As used herein, the term "transaction card" refers to any identification or payment card associated with a user or user account. This may include, in particular, a credit card, debit card, or gift card, any of which may be issued by a service provider. Typical transaction cards like card 10 in FIG. 1 carry visible information associated with the user or user account, such visible, account-specific information being referred to herein as account "indicia". Typical indicia shown on the front face of the card 10 includes an account number 11 associated with the card (often in raised text), the account holder's name 12, the name of the card issuer 13, and a card expiration date 14. Some cards also have a visible chip 16 and a CCV code 15 on their front face. The visibility of all this information provides a convenience to both the owner of the card and merchants processing the card for payment. It also, however, provides a significant security risk to the owner.

The present invention provides a transaction card processing system that makes use of a transaction card (referred to herein as an indicialess transaction card) that carries no visible account-specific text, numbers, symbols, or other indicia. The invention also provides a user device application that can be used to verify the presence of an authenticated indicialess card, then present an augmented reality (AR) image of related card indicia superimposed over an image of the indicialess card on a user device. The AR image is constructed so that the card indicia appears to be printed on the card in the same form and location as it would be on a standard, printed transaction card, regardless of the orientation of the card. The transaction card processing system makes use of near field communication (NFC) and cryptographic authentication methods to authenticate the indicialess card and to provide for secure communication between the transaction card and the user device.

Figure 2:
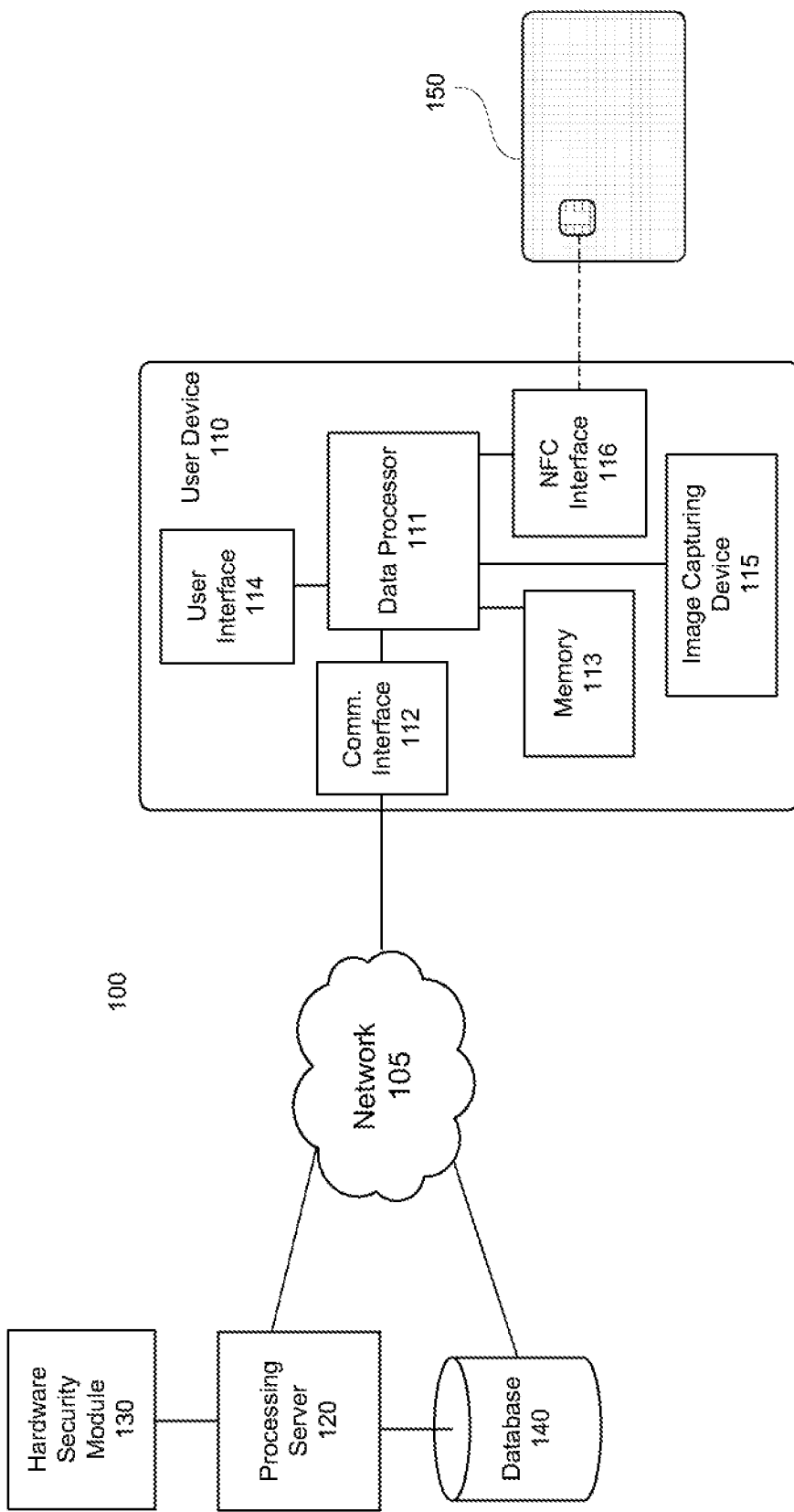
FIG. 2 a schematic representation of a transaction card information processing system according to an embodiment of the invention.

With reference to FIG. 2, transaction card information processing system 100 according to an illustrative embodiment of the invention includes a user device 110, a processing server 120, a hardware security module 130, a network 105, and an indicialess transaction card 150, which may be one of a plurality of transaction cards.

Figure 3:
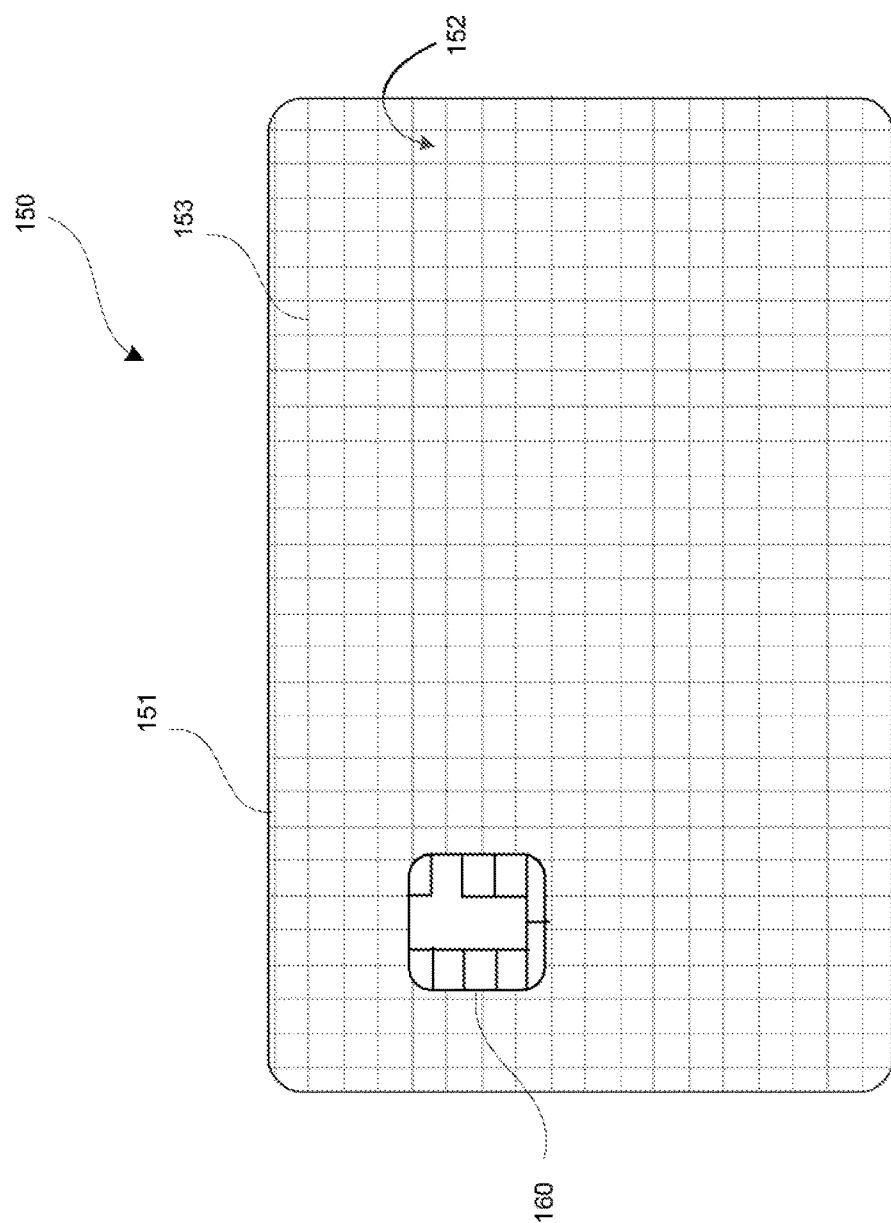
FIG. 3 is an illustration of an indicialess transaction card usable in conjunction with methods according to the invention.

As shown in FIG. 3, the indicialess transaction card 150 comprises a card body 151 of typical transaction card size and construction with a digital processor chip 160 embedded therein. The card body 151 may include a single layer or one or more laminated layers composed of plastics, metals, and other materials. Exemplary materials include polyvinyl chloride, polyvinyl chloride acetate, acrylonitrile butadiene styrene, polycarbonate, polyesters, anodized titanium, palladium, gold, carbon, paper, and biodegradable materials.

One or both of the front surface 152 and the back surface (not shown) of the card body 151 may be formed with or printed as a solid white or other color that is otherwise entirely featureless so as to provide an ideal background when viewed in conjunction with a superimposed AR image. Alternatively, as in the illustrated example, either or both the front and back surfaces may carry an unobtrusive, non-unique background pattern 153. The background pattern 153 may be a regular or irregular continuous geometric pattern or may be a repeated wallpaper pattern. The background pattern 153 is not unique to the specific indicialess card or the card account for which the indicialess card is to be used. The pattern 153 may, however, be applied to each of a particular batch of cards associated with a known account provider. In some embodiments, one or both of the front and back surfaces of the card body 151 may carry other non-unique patterns, symbols, or text that is not associated or identifiable with any particular account.

Figure 4:
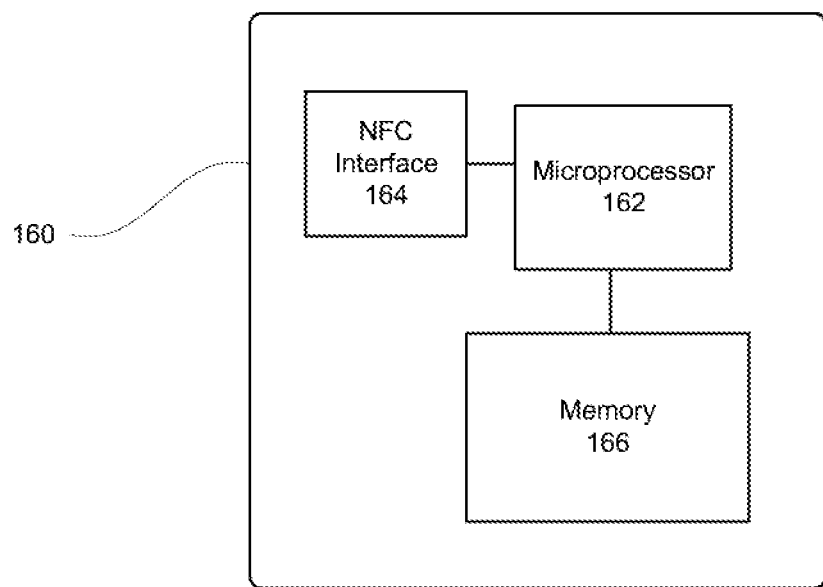
FIG. 4 is a block diagram of a processor chip of the indicialess transaction card of FIG. 3.

The digital processor chip 160 may be embedded into a depression formed through the front surface 152 of the card body 151. With reference to FIG. 4, the processor chip 160 includes processing circuitry for storing and processing information, including a microprocessor 162 and a memory 166. It will be understood that the processing circuitry may contain additional components, including processors, memories, error and parity/CRC checkers, data encoders, anticollision algorithms, controllers, command decoders, security primitives and tamper-proofing hardware, as necessary to perform the functions described herein. The memory 166 may be a read-only memory, write-once read-multiple memory or read/write memory, e.g., RAM, ROM, and EEPROM, and the chip 160 may include one or more of these memories. The memory 166 may be configured to store one or more software applications for execution by the microprocessor 162. Information associated with an account may also be stored in the memory 166. In particular, the memory may have stored therein a unique alphanumeric customer identifier assigned to the card.

The processor chip 160 further includes an NFC interface 164 configured for establishing communication with the user device 110 or other devices when the card 150 is within a predetermined NFC range. In some embodiments the NFC interface 164 may comprise a radio frequency identification chip configured to communicate via NFC or other short-range protocols. In some embodiments, the processor chip 16 may include circuitry configured for communication with the user device 110 via other means such as Bluetooth, satellite, Wi-Fi, wired communications, and/or any combination of wireless and wired connections.

In particular embodiments, the memory 166 of the processor chip 160 may have stored therein instructions for generating encrypted information and transmitting it to a receiving device (e.g., the user device 110) via the NFC interface 164. Such encrypted information may be or include an encrypted verification block that may be used by the user device 110, processing server 120, or hardware security module 130 to authenticate and verify the presence of the transaction card 110 during a transaction or prior to the display of account information on the user device 110.

It will be understood that the indicialess transaction card 150 in general, and the processor chip 160, in particular, may be configured with any functionality required to facilitate transactions in the same manner as indicia-carrying transaction cards. This includes, without limitation, the capability of interacting through direct contact or via wireless communication with merchant card processing machines to complete purchase or other financial transactions.

Returning now to FIG. 2, the user device 110 may be any computer device or communications device including a server, a network appliance, a personal computer (PC), a workstation, and a mobile interface device such as a smart phone, smart pad, handheld PC, or personal digital assistant (PDA). The user device 110 includes an on-board data processor 111 in communication with a memory module 113, a user interface 114, a communication interface 112, an image capturing device 115 (e.g., a digital camera) and an NFC interface 116. The data processor 111 can include a microprocessor and associated processing circuitry, and can contain additional components, including processors, memories, error and parity/CRC checkers, data encoders, anticollision algorithms, controllers, command decoders, security primitives and tamper-proofing hardware, as necessary to perform the functions described herein. The memory 113 can be a read-only memory, write-once read-multiple memory or read/write memory, e.g., RAM, ROM and EEPROM, and the user device 110 can include one or more of these memories.

The user interface 114 includes a user input mechanism, which can be any device for entering information and instructions into the user device 110, such as a touch-screen, keyboard, mouse, cursor-control device, microphone, stylus, or digital camera. The user interface 114 may also include a display, which can be any type of device for presenting visual information such as a computer monitor, a flat panel display, and a mobile device screen, including liquid crystal displays, light-emitting diode displays, plasma panels, and cathode ray tube displays.

The communication interface 112 is configured to establish and support wired or wireless data communication capability for connecting the device 110 to the network 105 or other communication network. The communication interface 112 can also be configured to support communication with a short-range wireless communication interface, such as near field communication, radio-frequency identification, and Bluetooth, through communication interface 215, along with radio transmissions.

The NFC interface 116 is configured for establishing near field communication with the data processing chip 160 on board the indicialess transaction card 150. The NFC interface 116 is further configured for receiving information transmitted by the data processing chip 160 via the chip NFC interface 164.

In embodiments of the invention, the memory 113 may have stored therein one or more applications usable by the data processor 111 to conduct and/or monitor transactions between the user device 110 and the processing server 120 or other device over the network 105. These applications may include instructions usable by the data processor 111 to identify transaction events, store event data in the memory 113, and communicate event data to the transaction processor 40 and/or the transaction monitoring system 100. Some applications may also include instructions relating to receiving and interpreting instructions from the transaction processor 40 or transaction monitoring system 100 and, in response, generating an image for display via the user interface 114.

In particular embodiments, the memory 113 may include one or more applications for receiving and reviewing images from the image capturing device 115. These may incorporate object recognition and analysis capabilities. In some embodiments, applications may be configured to recognize particular objects and to determine their pose relative to the user device 110. As used herein, the term "pose" means the three dimensional position (x,y,z) and orientation ($\theta$, $\varphi$, $\zeta$) of an object relative to a particular physical space or relative to another object. The memory 113 may also include one or more applications for generating AR images and displaying them in conjunction with real time views of recognized objects. These AR images may incorporate previously stored graphics and/or text and can be constructed for display superimposed on the real time image of the object. In particular embodiments, in which the three dimensional geometry of the recognized object is known, the AR images may be constructed so as to conform to that geometry regardless of the pose of the object relative to the user device 110.

The various applications of the user device 110 allow the user device to capture a real time image of a recognizable object, obtain information associated with the object (e.g., from the processing server 120), construct an AR image using the information, and display the information over the object in such a way that the information appears to be a part of the object or applied to a surface of the object. In the present invention, the user device 110 may be particularly configured to recognize a transaction card and, in particular, the indicialess transaction card 150. The user device 110 may, for example, be configured to recognize the presence of a background pattern 153 and verify that the background pattern 153 is associated with a known cardholder account provider. The user device 110 may further be configured to obtain information associated with the indicialess transaction card 150 (e.g., via NFC communication), communicate with the processing server 120 to assure that the card 150 is associated with an account associated with the user device 110, and, if so, construct an AR image using the obtained information and display the information over a real time image of a surface of the indicialess transaction card 150. In particular embodiments, the information is the same information that is presented on the face of a traditional transaction card and the AR image is constructed and displayed so that the information appears to be applied to the indicialess transaction card 150 in the usual manner. Using the three dimensional pose of the card 150 relative to the user device, the AR image may be constructed so that the displayed indicia are properly oriented and distorted (e.g., to account for perspective), regardless of the orientation of the card 150.

The user device 110 may be configured to transmit via the communication interface 112 and the network 105 information requests to the server 120. Such requests may, in particular be transmitted in response to an NFC communication with the indicialess transaction card 150. In some embodiments, the user device 110 may be configured to relay encrypted verification information received from the transaction card 150 to the processing server 120. Requests transmitted by the user device 110 to the server 120 may include, in particular a request for verification of card and/or account information or verification of authorization of the user device to receive or display information associated with the indicialess transaction card 150.

The processing server 120 may be one or more servers configured for communication with the user device 110 and an account information database 140. The processing server 120 is configured, in particular, for receiving account information requests from the user device 110, retrieving the appropriate account information from the account information database 140, and transmit the information to the user device 110. The processing server may also be configured to verify the authenticity of the indicialess card and authorization of the user device 110 to receive the requested account information. In some embodiments, the server 120 may pass information from the user device 110 to a hardware security module (HSM) 130, which may be configured to use the information to verify association of the user device 110 with the account associated with the indicialess transaction card 150. In particular embodiments, the HSM is configured to decrypt information received from the user device 110 and/or to encrypt information to be returned to the user device 110.

The processing server 120 and the user device 110 may be configured to communicate via a network 105. The network 105 may be any form of communication network capable of enabling communication between the transaction entities and the transaction monitoring system 100. For example, the network 105 may be one or more of a wireless network, a wired network or any combination of wireless network and wired network. The network 105 may be or include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g or any other wired or wireless network for transmitting and receiving a data signal. The network 105 may utilize one or more protocols of one or more network elements to which it is communicatively coupled. The network 105 may translate to or from other protocols to one or more protocols of network devices.

Although the network 20 is depicted as a single network, it will be appreciated that it may comprise a plurality of interconnected networks, such as, for example, the Internet, a service provider's network, a cable television network, corporate networks, and home networks.

Figure 5:
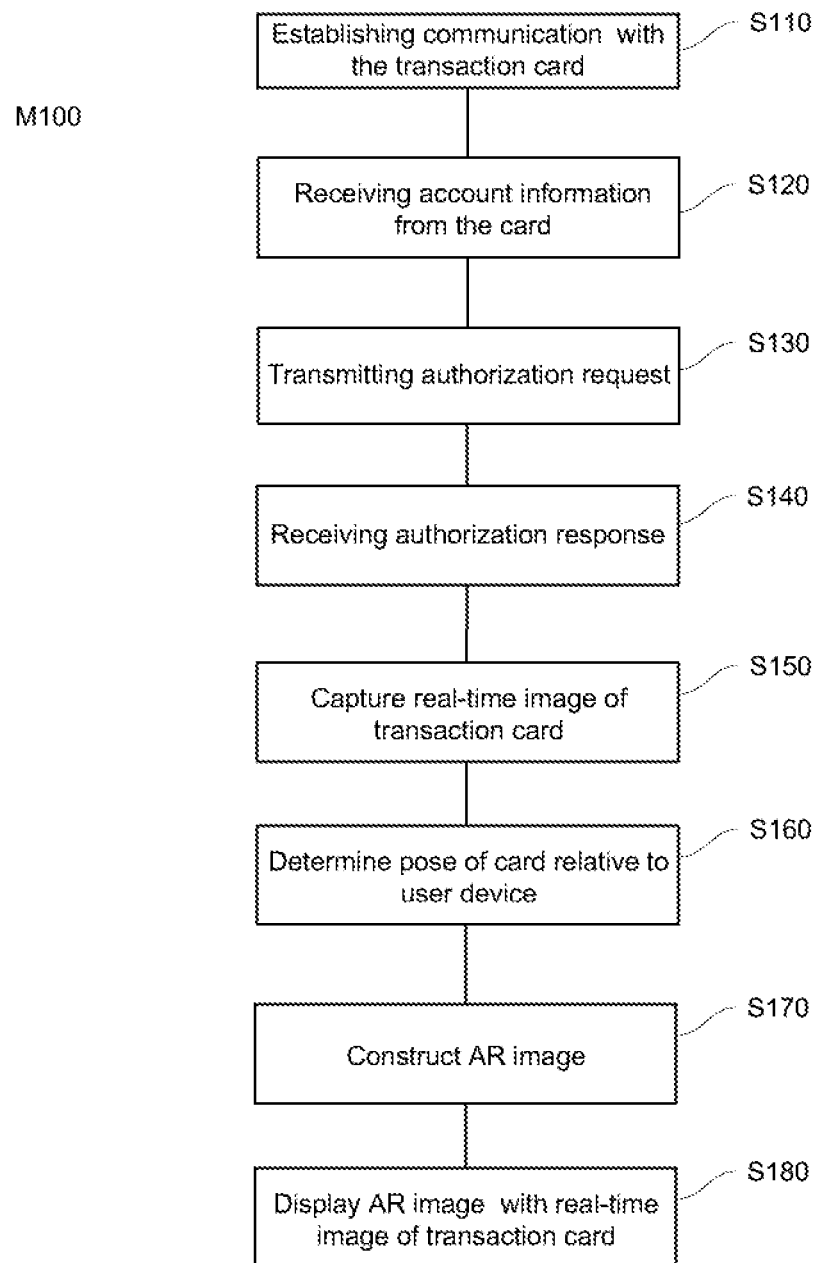
FIG. 5 is a flow chart of actions in an augmented-reality transaction card information display method according to an embodiment of the invention.

The transaction card processing system 100 may be used to carry out methods of displaying account information using augmented reality. FIG. 5 is a diagram of a method M100 that allows an account holder with an indicialess card to display AR account information on a user device. At S110 of M100, the user device establishes communication with the processor chip of the indicialess transaction card. In typical embodiments in which the transaction card and the user device are NFC enabled, this may be accomplished by activating an NFC application on the user device and tapping the card to the user device or by bringing the card to within NFC communication range of the user device. At S120, the user device receives information associated with the account from the processor chip of the indicialess transaction card. In some embodiments, this information may be or include an account number. In some embodiments, the information may be or include encrypted verification information. At S130, the user device transmits a display authorization request to a central processing server. The request includes user device identification information and some or all of the account information received from the transaction card. At S140, the user device receives an authorization response from the central server. The response may include confirmation of the association between the user device and the account associated with the transaction card. The response may also include an instruction to display an instruction to the device user to capture a live image of the indicialess transaction card. At S150, the user device captures a real-time image of the transaction card. Significantly, the transaction card need not be presented to the user device camera in any particular orientation. At S160, the user device uses object recognition and other image processing software to identify the transaction card within the captured image and determine the pose of the card relative to the user device. In embodiments where the indicialess card carries a known pattern, the image processing software can be configured to recognize and use this pattern along with the known dimensions of the card to determine the correct pose. The image processing software may also be configured to identify and reject images of cards carrying unrecognized images or indicia. At S170, the user device processor generates an AR image based on the pose of the transaction card relative to the user device. The AR image includes information associated with the account. In particular embodiments, the AR image includes some or all of the information typically printed on indicia-carrying transaction cards like that of FIG. 1. This may include any one or more of an account or identification number, the account holder's name, the name of the card issuer, the card expiration date, and a CCV code associated with the card. The AR image is constructed so that when displayed on the user device in conjunction with the real-time image of the transaction card, the account information appears to be printed on the card. At S180, the AR image is displayed on the user device so that it is superimposed over the real-time image of the card.

Figure 6A:
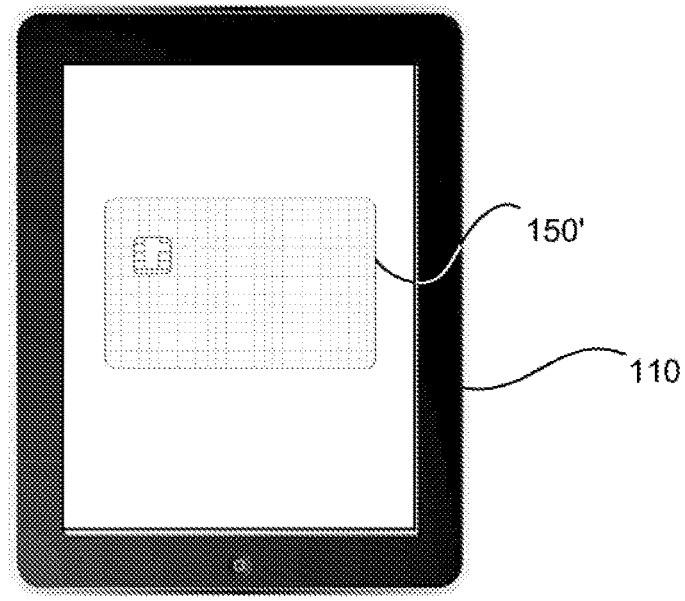
FIG. 6A is an illustration of a user device displaying an image of an indicialess transaction card in accordance with a method of the invention.
Figure 6B:
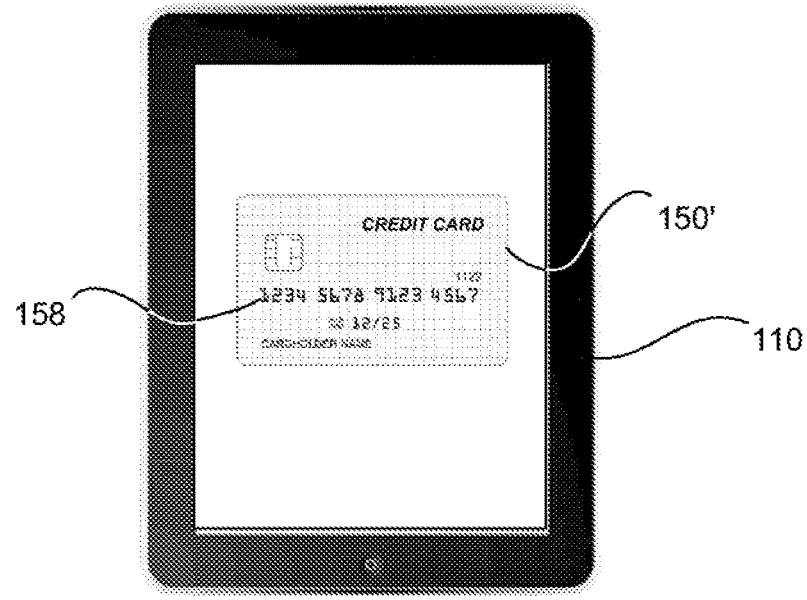
FIG. 6B is an illustration of a user device displaying an augmented reality image superimposed over an image of an indicialess transaction card in accordance with a method of the invention.
Figure 7A:
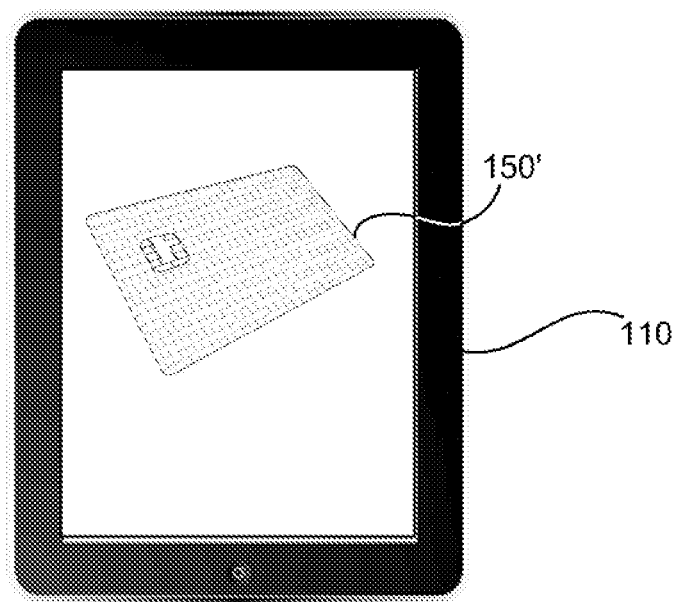
FIG. 7A is an illustration of a user device displaying an image of an indicialess transaction card in accordance with a method of the invention.
Figure 7B:
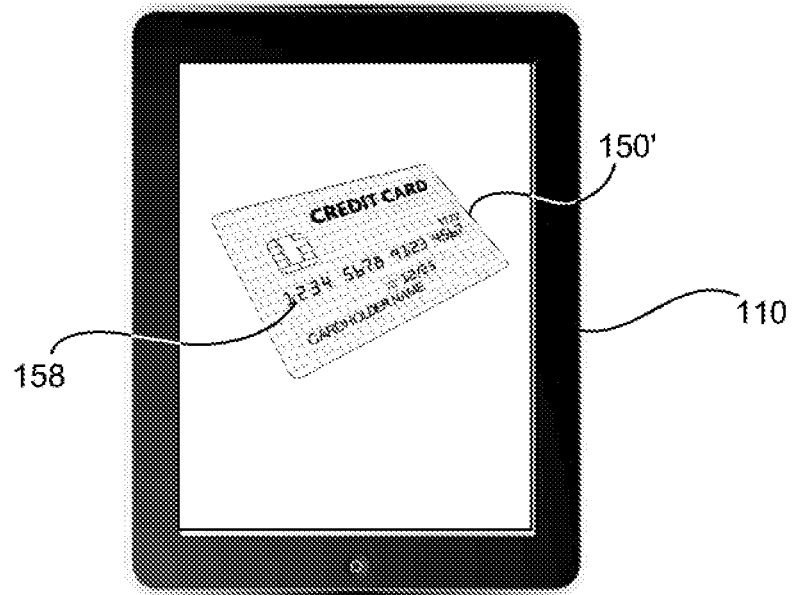
FIG. 7B is an illustration of a user device displaying an augmented reality image superimposed over an image of an indicialess transaction card in accordance with a method of the invention.

The actions S160, S170, and S180 of method M100 may be repeated continuously so that if the orientation of the transaction card changes, the AR image is adjusted to maintain the appearance of the information being printed on the card. FIG. 6A illustrates a user device 110 displaying a captured card image 150' of an indicialess transaction card in which the card is oriented with its front surface orthogonal to the line of view of the camera of the user device 110. FIG. 6B illustrates the display of an AR image 158 superimposed over the card image 150'. The result is the appearance in the display of an ordinary transaction card similar to that of FIG. 1. If the card is then tilted away from the user device 110, the captured card image 150' would appear as shown in FIG. 7A. As shown in FIG. 7B, the AR image constructed in accordance with the method M100 is adjusted so that the superimposed indicia are appropriately "distorted" to match the apparent surface of the card image 150'. To the viewer of the display, the card indicia still appear to be printed on the card.

Figure 8:
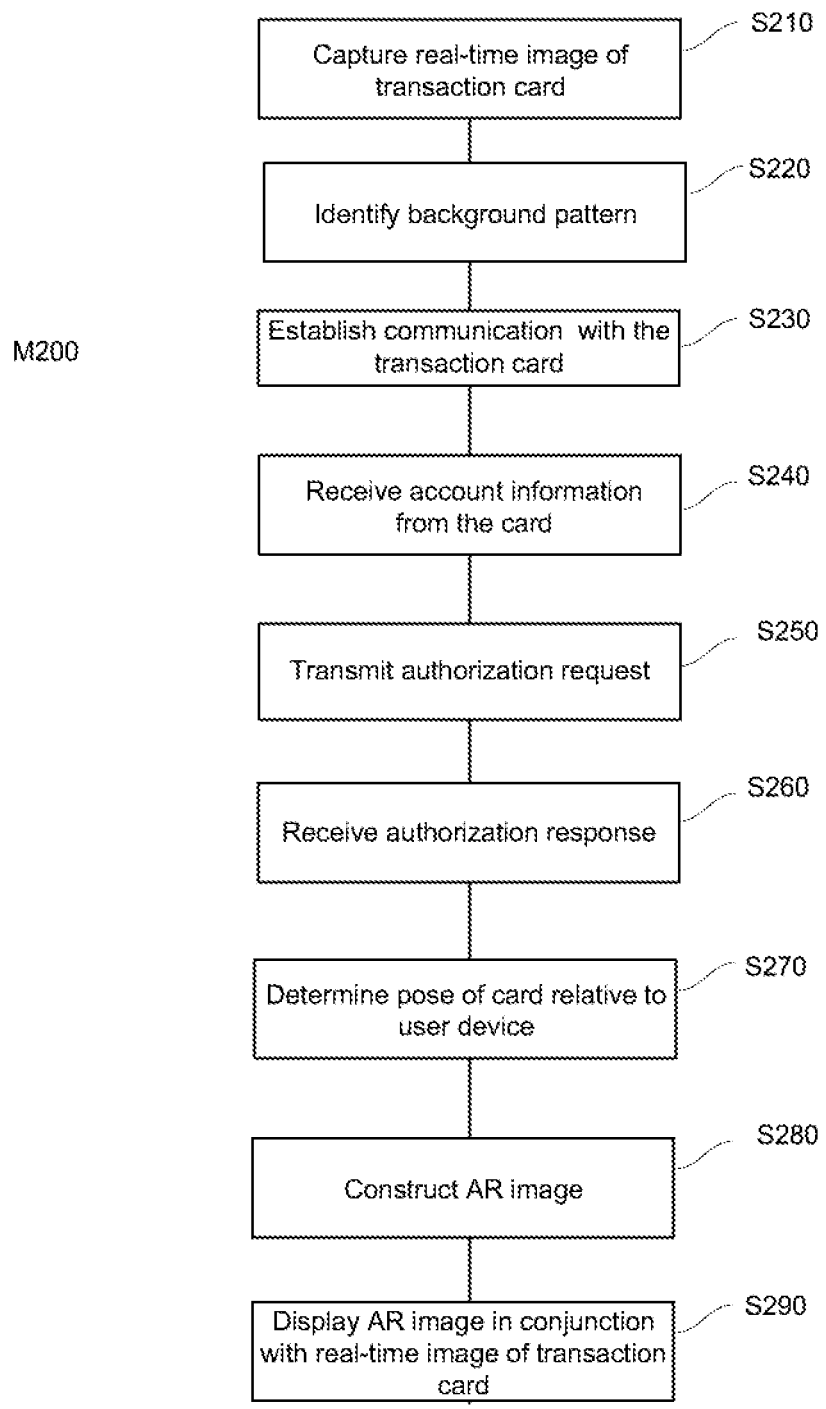
FIG. 8 is a flow chart of actions in an augmented-reality transaction card information display method according to an embodiment of the invention.

FIG. 8 is a diagram of another method M200 that allows an account holder with an indicialess card to display AR account information on a user device. At S210 of M200, the user device captures a real-time image of the indicialess transaction card. At S220, the user device uses object recognition and other image processing software to identify the background pattern applied to a surface of the transaction card. The image processing software may be configured to recognize the size and shape of the transaction card and then compare the image of the card surface to one or more pattern images that may be indirectly associated with the account associated with the card. In a particular example, a card account provider may provide cards with a number of different card patterns. Multiple cards may be produced for each pattern and distributed to account holders at random. All of the available patterns would be recognizable by the user device as associated with the account provider, but none would be indicative of account-specific information. The image processing software may also be configured to identify and reject images of cards carrying unrecognized images or indicia. Responsive to a determination that the pattern on the card surface matches a pattern associated with the account, the, user device establishes communication with the transaction card at S230. In typical embodiments in which the transaction card and the user device are NFC enabled, this may include prompting the user to tap the card to the user device or to bring the card to within NFC communication range of the user device. The action may then further include establishing NFC communication with the processor chip of the indicialess transaction card based on the user action. At S240, the user device receives information associated with the account from the processor chip of the indicialess transaction card. In some embodiments, this information may be or include an account number. In some embodiments, the information may be or include encrypted verification information. At S250, the user device transmits a display authorization request to a central processing server. The request includes user device identification information and some or all of the account information received from the transaction card. At S260, the user device receives an authorization response from the central server. The response may include confirmation of the association between the user device and the account associated with the transaction card. At S270, the user device uses the image processing software to determine the pose of the transaction card relative to the user device. The image processing software can be configured to use the pattern applied to the card surface along with the known dimensions of the card to determine the correct pose. At S280, the user device processor generates an AR image based on the pose of the transaction card relative to the user device. The AR image includes information associated with the account. In particular embodiments, the AR image includes some or all of the information typically printed on indicia-carrying transaction cards like that of FIG. 1. This may include any one or more of an account or identification number, the account holder's name, the name of the card issuer, the card expiration date, and a CCV code associated with the card. The AR image is constructed so that when displayed on the user device in conjunction with the real-time image of the transaction card, the account information appears to be printed on the card. At S290, the AR image is displayed on the user device so that it is superimposed over the real-time image of the card.

It will be understood that while the user device in the above methods will typically be a device of the account holder, it can also be a device of a merchant, account administrator, or other entity that has access permission to access the account holder's account information.

The use of indicialess transaction cards provides a significant improvement to the protection of user account information. The methods of the present invention facilitate the use of such cards by providing authorized users access to account information associated with an indicialess card to the user when needed. Further, the methods of the invention allow the account information to be presented in a unique manner that the user can view and, if necessary, show to others.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

What is claimed is:

1. A transaction card information processing system, comprising:
    an authentication server in communication with a card database, wherein the authentication server is configured to
        receive, over a network, an authentication request to authenticate a challenge to an account holder card, wherein the account holder card is configured to:
            have a unique identifier associated with an account holder account, and
            comprise a card body having at least one indicialess card surface having a background pattern applied thereto, the background pattern being associated with a card account provider but not being unique to the account holder card and not being usable to identify the account holder account,
        compare information in the authentication request to information from the card database, and
        transmit, over the network, an authentication response; and
    a mobile interface device associated with the account holder account, wherein the mobile interface device comprises:
        a mobile device data processor,
        a communication interface configured for selective communication with the authentication server via the network, and
        a digital camera configured to capture a real-time image of the account holder card,
    wherein the mobile device data processor is configured to
        recognize an appearance of the account holder card including the background pattern within the real-time image, receive, via the communication interface, card information from a card processor of the account holder card, communicate with the authentication server to confirm that the account holder card is associated with the account holder account, transmit, to the authentication server via the communication interface, the authentication request to confirm that the account holder card is associated with the account holder account, receive, from the authentication server via the communication interface, the authentication response including a confirmation, and in response to the confirmation, construct an augmented reality image containing indicia related to the account holder account and display the augmented reality image superimposed over the real-time image of the account holder card.

2. The transaction card information processing system of claim 1, wherein the card body include a near field communication card interface, a card data processor in communication with the near field communication card interface, and a card memory having the unique identifier stored therein.

3. The transaction card information processing system of claim 1, wherein the card database is configured to store card data including the unique identifier and associated account information.

4. The transaction card information processing system of claim 1, wherein the communication interface is a near field communication interface configured for communication with the account holder card, and the mobile device data processor is configured to establish communication with the account holder card when the account holder card is positioned within a near field communication distance of the near field communication interface.

5. The transaction card information processing system of claim 4, wherein a card data processor of the account holder card is configured to construct an encrypted verification block and to transmit the encrypted verification block to the mobile interface device via the near field communication card interface, and the mobile device data processor is configured to receive the encrypted verification block from the card data processor.

6. The transaction card information processing system of claim 5, wherein the authentication request includes the encrypted verification block, and the authentication server is configured to decrypt the encrypted verification block for use in authenticating the account holder card.

7. The transaction card information processing system of claim 1, wherein the action to recognize an appearance of the account holder card includes processing the real-time image to determine if a background pattern of the account holder card matches one of a plurality of non-unique card background patterns associated with the card account provider.

8. The transaction card information processing system of claim 7, Wherein the actions to receive card information, transmit the authentication request, and receive the authentication response are carried out only in response to a determination that the background pattern of the account holder card matches one of the plurality of non-unique card background patterns.

9. The transaction card information processing system of claim 1, wherein the mobile device data processor is configured to determine, from the real-time image, a position and orientation of the account holder card relative to the mobile interface device.

10. The transaction card information processing system of claim 1, wherein the action of constructing an augmented reality image includes configuring the augmented reality image so that when the augmented reality image is superimposed over the real-time image of the account holder card, the account indicia is positioned in a predetermined location and at a predetermined orientation relative to a card surface of the account holder card.

11. The transaction card information processing system of claim 1, wherein the account indicia comprise at least one selected from a group consisting of a transaction card number, a CCV, and a card expiration date.

* * * * *